United States Patent
McDaniel et al.

[15] 3,650,687
[45] Mar. 21, 1972

[54] PROCESS FOR PREPARING BINDERLESS MOLECULAR SIEVE AGGREGATES

[72] Inventors: Carl Vance McDaniel, Laurel; Philip Kenerick Maher, Baltimore; Joseph Michael Pilato, Silver Spring, all of Md.

[73] Assignee: W. R. Grace & Co., New York, N.Y.

[22] Filed: May 14, 1969

[21] Appl. No.: 841,660

Related U.S. Application Data

[60] Division of Ser. No. 760,970, Sept. 19, 1968, Pat. No. 3,472,940, Continuation-in-part of Ser. No. 515,227, Dec. 20, 1965, abandoned.

[52] U.S. Cl. ............................................23/112, 252/455 Z
[51] Int. Cl. ................................................C01b 33/28
[58] Field of Search ..................23/112; 252/455, 448, 449; 159/4

[56] References Cited

UNITED STATES PATENTS

| | | |
|---|---|---|
| 2,831,652 | 4/1958 | Gemperle et al. ...................252/448 |
| 3,065,054 | 11/1962 | Haden et al. .............................23/112 |
| 3,119,660 | 1/1964 | Howell et al. .............................23/112 |
| 3,185,544 | 5/1965 | Maher ......................................23/112 |
| 3,403,110 | 9/1968 | Sanborn et al. .......................253/455 |

*Primary Examiner*—Edward J. Meros
*Attorney*—Lawrence S. Squires and Kenneth E. Prince

[57] ABSTRACT

Methods of preparing attrition resisting binderless molecular sieve zeolite aggregates having a particle size of about 50 to 200 microns are disclosed. The processes are characterized by a high temperature spray drying step. The product is particularly useful in fluidized adsorption and fluidized catalyst systems.

7 Claims, No Drawings

PROCESS FOR PREPARING BINDERLESS MOLECULAR SIEVE AGGREGATES

CROSS REFERENCE TO RELATED APPLICATIONS

This application is a division of application Ser. No. 760,970 filed Sept. 19, 1968, now U.S. Pat. No. 3,472,617, which is a continuation-in-part of application Ser. No. 515,227 filed Dec. 20, 1965, now abandoned.

BACKGROUND OF THE INVENTION

1. Field of the Invention

This invention relates to processes for preparing binderless crystalline aluminosilicates particles. In one aspect, it relates to a method of preparing binderless molecular sleeves having an easily fluidizable particle size and a superior attrition resistance.

2. The Prior Art

Molecular sieves are crystalline metal aluminosilicates having a three-dimensional interconnecting network structure of silica and alumina tetrahedra. The tetrahedra are formed by four oxygen atoms surrounding a silicon or aluminum atom. This structure permits a neat chain arrangement of building tetrahedra uniformly in 4 directions. Since oxygen atoms have two negative charges while the silicon atoms have 4 positive charges and the aluminum atoms have 4 positive charges, the trivalence of the aluminum causes the alumina tetrahedra to be negatively charged, thus requiring an additional cation charge to balance the system. In the usual synthesized form this charge is usually supplied by a sodium or potassium cation, most frequently sodium. These charge balancing cations are exchangeable ions and may be exchanged with other cations.

In the zeolite crystal structure up to half the quadravalent silicon atoms can be replaced by trivalent aluminum atoms. Thus, by regulating the ratios of the starting materials used to prepare the zeolites it is possible to produce zeolites containing different ratios of silica to alumina having essentially the same crystal structure and also those zeolites having different structures.

The crystalline zeolites, particularly those designated as Types A, X, and Y, have become widely acclaimed for their value as selective adsorbents and catalysts. The ability to selectively adsorb molecules based on their kinetic molecular diameter and polarity is attributed to the unique crystalline structure of the zeolites which exhibit series of uniformly sized pore openings which permit the adsorption of molecules having a sufficiently small kinetic molecular diameter to permit its entry into the zeolite while excluding larger molecules. For example, in the crystalline zeolite designated as Type A the tetrahedra are grouped to form a truncated octahedron with a silica or alumina tetrahedron at each point. This structure is known as a sodalight cage, which in itself contains a small cavity which is of no practical significance since the largest openings are not large enough to permit the entrance of most molecules. However, when the sodalight cages are stacked in simple cubic forms, as they are in the Type A zeolite, the result is a network of cavities approximately 11.5 A. in diameter, which is accessible through openings on all six sides. These openings are surrounded by eight oxygen atoms and are partially blocked by the exchangeable charge balancing cation. Thus, by substituting different cations for the balancing cations, zeolites of different effective pore size openings and therefore selectivity, can be obtained. In the usual, sodium synthesized form of Type A this ring of oxygen atoms provides an opening of about 4.2 A. in diameter. By exchanging the sodium cation, or preparing the zeolite, with potassium ions the pore opening will be reduced to 3 A. Similarly by ion exchanging the sodium ion with a divalent cation such as for example, calcium the pore opening will be increased, e.g., the calcium form Type A has a pore opening of about 5 A in diameter, since only half as many cations will be required to balance the negative charge.

These crystalline zeolites are formed with a large amount of water hydration which fills the cavities. Fortunately this water of hydration is loosely bound and can be easily removed by moderate heating. The zeolite is then free to absorb molecules of the current kinetic molecular diameter and polarity into these cavities.

The molecular sieve hereinafter designated Z-12 is essentially the same as the molecular sieve designated Type A by the Linde Division of the Union Carbide Corporation. This molecular sieve has the emperical formula:

$$1\pm0.2:M_{2/n}O:Al_2O_3:1.85\pm0.5\ SiO_2:YH_2O.$$

In this formula M represents a metal and n is its valence and Y may be any value up to 6 depending on the identity of the metal and the degree of dehydration of the crystals. This zeolite has the following X-ray diffraction pattern:

TABLE A

| | |
|---|---|
| 12.29 ± | 0.02 A. |
| 8.71 ± | 0.02 A. |
| 7.11 ± | 0.01 A. |
| 5.51 ± | 0.01 A. |
| 5.03 ± | 0.01 A. |
| 4.36 ± | 0.01 A. |
| 4.107 ± | 0.004 A. |
| 3.714 ± | 0.003 A. |
| 3.417 ± | 0.003 A. |
| 3.293 ± | 0.002 A. |
| 2.987 ± | 0.002 A. |
| 2.904 ± | 0.002 A. |
| 2.754 ± | 0.002 A. |
| 2.688 ± | 0.002 A. |

Another form of zeolite which has become of particular interest to the art are those referred to as faujasite. This encompasses the zeolites designated Type X and Y. These zeolites have a crystalline structure similar to that of Type A in that they are also made up of the basic sodalight building blocks. However, in this case, the sodalite cages are arranged in a tetrahedral relationship (diamond structure) with bridging across the 6 membered hexagonal rings thereby forming a 12-membered oxygen atom ring. These rings provide pore openings of about 9-10 A in diameter. As with the Type A structure the overall electrical charge is balanced by a positively charged exchangeable cation. As well as being a very desirable selective adsorbent the faujasite zeolites are also highly regarded by the art for their catalytic activity especially in the promotion of those reactions used in the petroleum or hydrocarbon treating industries.

The zeolite hereinafter designated Z-14 which is substantially identical with the product designated Type X by the Linde Division of the Union Carbide Corporation. This zeolite has the emperical formula:

$0.9\pm0.2\ M_{2/n}O:Al_2O_3:2.5\pm0.5\ SiO_2:YH_2O$. In this formula M represents a metal and n is its valence, Y may be any value up to 8 depending on the identity of the metal and the degree of hydration of the crystals. The zeolite has the following X-ray diffraction pattern:

TABLE B

| | |
|---|---|
| 14.42 ± | 0.2 A. |
| 8.82 ± | 0.1 A. |
| 4.41 ± | 0.05 A. |
| 3.80 ± | 0.05 A. |
| 3.33 ± | 0.05 A. |
| 2.88 ± | 0.05 A. |
| 2.79 ± | 0.05 A. |
| 2.66 ± | 0.05 A. |

The third molecular sieve of current commercial interest is the product hereinafter designated Z-14HS. This zeolite is substantially identical to the product designated Type Y by the Linde Division of Union Carbide Corporation. The emperical formula of this zeolite is as follows:

$$0.9\pm0.2\ Na_2O:Al_2O_3:WSiO_2:XH_2O$$

where W is a value greater than 3 and X may have a value up to about 9. The X-ray diffraction pattern of this material is shown in the following Table.

TABLE C

| | | |
|---|---|---|
| 14.37 | — | 14.15 A. |
| 14.37 | — | 14.15 A. |
| 8.80 | — | 8.67 A. |
| 7.50 | — | 7.39 A. |
| 5.71 | — | 5.62 A. |
| 4.79 | — | 4.72 A. |
| 4.46 | — | 4.33 A. |
| 4.29 | — | 4.16 A. |
| 4.13 | — | 4.09 A. |
| 3.93 | — | 3.88 A. |
| 3.79 | — | 3.74 A. |
| 3.66 | — | 3.62 A. |
| 3.48 | — | 3.43 A. |
| 3.33 | — | 3.28 A. |
| 3.04 | — | 3.00 A. |
| 2.93 | — | 2.89 A. |
| 2.87 | — | 2.69 A. |
| 2.65 | — | 2.61 A. |

The product recovered from the usual methods used to prepare molecular sieves described in the patent and technical literature is a fine sized crystalline material. Several of the uses for molecular sieves require a product in a size range substantially larger than the size of the product recovered from the preparation processes of the prior art. To meet this demand, processes have been developed which add various binders and use forming steps to prepare nodules containing molecular sieves as the principal ingredient. These products lose some of their effectiveness since the binder is generally inert and acts as a diluent of the molecular sieve activity. It would therefore be highly desirable to develop a method of preparing binderless molecular sieve aggregates having a particle size suitable for fluidized systems (i.e., about 50–200 microns) and possessing good attrition resistance.

The prior art has developed processes of producing binderless sieve aggregates from silica and alumina starting materials such as silica-alumina catalysts and clay. Unfortunately the products produced by these processes, especially where clay is used as a starting material, generally have very poor attrition resistance and thus rapidly attrite during use into unsuitable powders which must be replaced. Also the prior art processes are frequently relatively expensive and usually produce aggregates which have particle sizes greater than that desired for fluidized bed operation as they usually rely on pelleting or some similar shaping method which inherently produce shape sizes greater than 200 microns.

Since clay is a comparatively inexpensive starting material, it would be particularly desirable to produce essentially 100 percent pure binderless molecular sieve aggregates having a particle size in the range of about 50 to 200 microns and having good attrition resistance.

OBJECTS AND SUMMARY

Objects

It is therefore an objective of the invention to provide processes and means of preparing binderless molecular sieve zeolite aggregates having particle sizes in the range of about 50 to 200 microns and possessing good attrition resistance.

It is a further object of the invention to provide processes of preparing binderless molecular sieve zeolite aggregates, having particle sizes in the range of about 50 to 200 microns and having good attrition resistance, from clay starting materials.

It is a still further object of the invention to provide processes of preparing, respectively, Types A, X and Y binderless molecular sieve zeolite aggregates having particle sizes in the range of 50 to 200 microns and having good attrition resistance.

It is also an object of the invention to provide improved binderless molecular sieve zeolite aggregates.

Additional objects will be apparent and in part obvious from the following description and the appended claims.

SUMMARY

These and other objects can be accomplished by our invention the process of which in summary comprises the steps of:

1. Preparing a slurry, typically an aqueous slurry, comprising a calcined (dehydrated) kaolin type clay and an alkali silicate in proportion to each other to provide a slurry composition having the following mole ratios:

$M_{2/n}O/Al_2O_3$ of about 0.2 to 0.5
$SiO_2/Al_2O_3$ of about 2 2/3 to 3 2/3 where M* is alkali metal cation and n is its valence. Typically $M^*_{n/2}O$ is $Na_2O$.

2. In the next step of our process the slurry is spray dried under conditions such that the particles obtain a temperature in the range of about 800° to 2000°F. This unique high temperature spray drying step shapes the clay or clay mixture into particles having particle sizes in the range of about 50 to 200 microns and gives these particles an exceptional hardness.

3. The particles are then mixed with such additional materials (typically an aqueous alkali hydroxide solution) in such relative quantities as are required to form a reaction mixture for the particular type zeolite desired.

4. The reaction mixture is then aged at temperatures in the range of about 15° to 50°C. for from about 4 to 48 hours. The aged mixture is then crystallized at temperatures in the range of about 80° to 120°C. for from about 4 to 48 hours, to the desired zeolitic binderless aggregates.

In another preferred embodiment, according to our invention, for producing Z–12 (Type A) binderless sieves we spray dry an uncalcined kaolin type clay slurry into 50 to 200 micron particles using particle temperatures in the range of about 800° to 2000°F. The spray dried particles are then calcined at temperatures in the range of about 1200° to 2000°F. Where the particles have reached temperatures in this range during the spray drying step the calcination step can be omitted. The particles are mixed with such additional materials, typically an aqueous alkali hydroxide solution, and in such relative quantities as are required to form a reaction mixture for Z–12 zeolite. The reaction mixture is then aged at temperatures in the range of about 15° to 50°C. for from about 4 to 48 hours. The aged mixture is then crystallized, at temperatures in the range of about 80° to 120°C. for from about 4 to 48 hours, to Z– 12 zeolite binderless aggregates.

The binderless molecular sieve zeolite aggregates produced by our process have particle sizes in the range of from about 50 to 200 microns and have a Roller Attrition Index of about 5 to 35. Further our binderless molecular sieves are essentially 100 percent pure crystalline zeolite.

DETAILED DESCRIPTION OF THE INVENTION AND PREFERRED EMBODIMENTS

For purposes of simplicity the invention will be described with respect to the currently most commercially significant zeolites Z–12 (Type A), Z–14 (Type X), and Z–14HS (Type Y).

However, our broad process could obviously also be used to prepare other molecular sieve zeolites as attrition resistant binderless molecular sieve aggregates in the 50 to 200 micron size range. Representative of the molecular sieve materials that can be prepared by our process or modifications thereof include the zeolites designated zeolites S, R, H, B, F, N, E, T and L, for example, by the Linde Division of the Union Carbide Corporation, as well as the synthetic mordenite and chabazite compositions. Further information on these zeolites can be obtained from the following Table and the patent references enumerated therein:

TABLE I

| Zeolite | Oxide mole ratios (shown as alkali metal oxide form) | Patent disclosure |
|---|---|---|
| Zeolite: | | |
| X | $1.0 \pm 0.2\ Na_2O:Al_2O_3:2.5 \pm 0.5,\ SiO_2:0\text{-}8H_2O$ | U.S. 2,882,244. |
| Y | $0.9 \pm 0.2\ Na_2O:Al_2O_3:3\text{-}6,\ SiO_2:0\text{-}9H_2O$ | U.S. 3,130,007. |
| A | $1.0 \pm 0.2\ Na_2O:Al_2O_3:1.85 \pm 0.5,\ SiO_2:0\text{-}6H_2O$ | U.S. 2,882,243. |

TABLE I

| Zeolite | Oxide mole ratios (shown as alkali metal oxide form) | Patent disclosure |
|---|---|---|
| L | $1.0\pm0.1$ $Na_2O$:$Al_2O_3$:$6.4\pm0.5$, $SiO_2$: $0-7H_2O$ | Bel. 575,117. |
| D | $0.9\pm0.2$ [(0-1) $Na_2O$:(1-0) $K_2O$]:$Al_2O_3$:$4.5-4.9$ $SiO_2$: $0-7H_2O$ | Can. 611,981. |
| R | $0.9\pm0.2$ $Na_2O$:$Al_2O_3$:$2.45-3.65$, $SiO_2$: $0-7H_2O$ | U.S. 3,030,181. |
| S | $0.9\pm0.2$ $Na_2O$:$Al_2O_3$:$4.6-5.9$, $SiO_2$: $0-7H_2O$ | U.S. 3,054,657. |
| T | $1.1\pm0.4$ [(0.1-0.8)$Na_2O$: (0.9-0.2)$K_2O$]:$Al_2O_3$:$6.9\pm0.5$ $SiO_2$: $0-8H_2O$ | U.S. 2,950,952. |
| Z | $K_2O$:$Al_2O_3$:$2SiO_2$: $0-3H_2O$ | Can. 614,995. |
| E | $0.9\pm0.1$ $Na_2O$:$Al_2O_3$:$1.95\pm0.1$ $SiO_2$: $0-4H_2O$ | Can. 636,931. |
| F | $0.95\pm0.15$ $Na_2O$:$Al_2O_3$:$2.05\pm0.3$ $SiO_2$: $0-3H_2O$ | U.S. 2,996,358. |
| O | $0.95\pm0.05$ $Na_2O$:$Al_2O_3$:$12.2\pm0.05$ $SiO_2$: $0-5H_2O$ | U.S. 3,140,252. |
| B | $1.0\pm0.2$ $Na_2O$:$Al_2O_3$:$3.5\pm1.5$ $SiO_2$: $0-6H_2O$ | U.S. 3,008,803. |
| Q | $0.95\pm0.05$ $Na_2O$:$Al_2O_3$:$2.2\pm0.05$ $SiO_2$: $XH_2O$ | U.S. 2,991,151. |
| M | $1.0\pm0.1$ $K_2O$:$Al_2O_3$:$2.0\pm0.1$ $SiO_2$: $XH_2O$ | U.S. 2,995,423. |
| H | $1.0\pm0.1$ $Na_2O$:$Al_2O_3$:$2.0\pm0.1$ $SiO_2$: $XH_2O$ | U.S. 3,010,789. |
| J | $0.9\pm0.1$ $K_2O$:$Al_2O_3$:$2.1\pm0.2$ $SiO_2$: $XH_2O$ | U.S. 3,011,869. |
| W | $1.0\pm0.1$ $Na_2O$:$Al_2O_3$:$4.1\pm0.8$ $SiO_2$: $YH_2O$ | U.S. 3,012,853. |
| XG | $0.9-1.1$ $Na_2O$:$Al_2O_3$:$2.3-4.2$ $SiO_2$:$2.6-4.6$ $H_2O$ | U.S. 3,056,654. |

The first step in our process is the selection of a suitable clay. Suitable clays include those of the Kaolin family of clays. This broadly encompasses naturally occurring clays containing any of the minerals kaolinite, halloysite, anauxite, dickite, narrite and the like or a combination of these minerals, as their predominate constituent. These minerals are hydrous aluminosilicates having a composition represented by the formula:

$$Al_2O_3 \cdot 2SiO_2 \cdot xH_2O$$

where x is the degree of hydration and is typically in the range of about 2 to 4. We have found the species of kaolin type clays designated as kaolin to give particularly good results.

Considering now our broad process which has broad application in the preparation of various types (e.g., Types A, Y and X) of crystalline zeolite binderless aggregates, the clay used for this process must be substantially completely dehydrated. The dehydration can be accomplished by calcining the hydrated form of the clay at a temperature in the range of 1200° to 2000°F. until substantially all of the water is removed. The dehydrated form of kaolin is frequently referred to as metakaolin.

The next step of our process is to prepare a slurry of the dehydrated clay and an alkali silicate in a suspending medium. Typically the slurry will be an aqueous slurry though other suitable slurrying mediums can be used. The solids content of the slurry should be adjusted as a function of the requirements of the particular spray drier being used. The relative quantities of dehydrated clay and alkali silicate are controlled to provide a slurry composition having about the following mole ratios:

$$M^*_2O/Al_2O_3 = 0.2 \text{ to } 0.5$$
$$SiO_2/Al_2O_3 = 2\,\tfrac{2}{3} \text{ to } 3\,\tfrac{2}{3}$$

where M* is an alkali metal. Typically the alkali silicate used in our process, in view of its easy availability, will be sodium silicate. These ratios are very important to our process since if the slurry contains a low ratio of alkali oxide the particles will have very poor attrition resistance and largely will not even survive the attrition encountered in spray drying. And if the slurry contains a higher quantity of alkali oxide than this, it will not spray dry properly at the high temperatures required in our process but, instead will cake along the sides of the spray drier rather than forming the desired 50 to 200 microns sized particles. Further, when high quantities of alkali oxide are present in the slurry the reaction of clay into sodalite can take place at the high temperatures used in the spray drier.

The crux of our invention resides in spray drying under conditions of high temperature such that the particles will achieve particle temperatures in the range of about 800° to 2000°F. This high temperature gives the particles exceptional attrition resistance and hardness. The spray drier nozzle and operating conditions should be selected to predominately form particles having diameters in the range of about 50 to 200 microns. The particular spray drier used and the manner of spray drying is not crucial so long as particles of the correct particle size are formed and the particles are heated to from about 800° to 2000°F. Typically the particles will be formed as microspheres. One type of spray drier which we have found to be particularly suitable is the so-called furnace type spray drier. In this type of spray drier the side walls of the drier are maintained at a high temperature thereby causing the interior drying chamber into which the slurry is sprayed to be also heated to a high temperature. By regulating the drier temperature, spraying rate, and mean particle path length the desired particle temperature can be achieved. While the aforementioned spray drier is particularly suited to our process other spray driers can, of course, be used so long as they can produce the proper particle temperatures and sizes.

In the next step of our process such additional reactants are mixed with the calcined clay particles as are required to produce the desired zeolite. Typically this will be an aqueous alkali hydroxide solution, containing in some instances additional silicate or aluminate components. The particular reactant ratios required to produce a given zeolite can be obtained from the prior art describing the synthesization of that particular zeolite; note for example the patent references set forth hereinbefore in Table I.

Considering this step in greater detail for the zeolites of primary commercial significance, i.e., Z-12 (Type A); Z-14 (Type X); and Z-14HS (Type Y). When Z-12 zeolite is the desired product, the chemical composition of the reaction mixtures, including the silica and alumina supplied by the clay, should be in the following molar ranges:

| $SiO_2/Al_2O_3$ | 0.5 to 2.5 | preferably 1.7 to 2.3 |
| $M^*_2O/Al_2O_3$ | 0.9 to 6 | preferably 1.5 to 3 |
| $H_2O/M^*_2O$ | greater than 15 | preferably 16 to 200 |

The higher silica contents of Z-14 and Z-14HS zeolites require the following changes in these ratios. For Z-14 and Z-14HS, the ratios should be as follows:

| Z-14 (Type X) | | |
|---|---|---|
| $SiO_2/Al_2O_3$ | 2.4 to 8 preferably | 2.5 to 5 |
| $M^*_2O/Al_2O_3$ | 2.5 to 8 preferably | 2.7 to 6 |
| $H_2O/M^*_2O$ | Greater than 15 preferably | 16 to 200 |

| Z-14HS (Type Y) | | |
|---|---|---|
| $SiO_2/Al_2O_3$ | 3.5 to 20 preferably | 4 to 15 |
| $Na_2O/Al_2O_3$ | 2.5 to 10 preferably | 3.0 to 7 |
| $H_2O/M^*_2O$ | Greater than 15 preferably | 16 to 200 |

In the above mole ratios M* represents an alkali metal cation. The zeolites are commonly produced in the sodium form as sodium hydroxide i.e., the typical source of the $Na_2O$ component) is commercially available in large quantities and because it is easier to handle and less expensive than the corresponding materials. Thus, in the chemical formula M is typically sodium and the other forms of the zeolite usually being prepared by ion exchange techniques. These reaction mixtures appear as alkaline aqueous slurries of the clay particles in an aqueous metal oxide solution having a pH of about 11 to 14.

The reaction mixture is then aged at temperatures in the range of about 15° to 50°C. for about 4 to 48 hours. Conveniently, ambient temperatures are used for the aging step. Hydrothermal conversion to the desired binderless crystalline zeolite aggregates is then effected at temperatures in the range of about 80° to 150°C. for about 4 to 48 hours. Shorter times within these ranges can be used with the higher temperature ranges.

The remaining steps of our process are conventional. After the hydrothermal conversion step, the product is separated, washed, dried, using conventional techniques. The product can then be activated by mild calcination or can be later activated at the job site in the adsorber or the reactor just prior to use.

In another particularly desirable embodiment for the preparation of Z–12 binderless zeolite aggregates we form the spray dried particles using hydrated kaolin type clay. In this embodiment a slurry of hydrated clay is provided without the addition of an alkali silicate. It should be stressed with regard to this embodiment that hydrated and not dehydrated clay is initially used and that an alkali silicate is not added to the slurry since even small amounts are deleterious to the spray drying of this slurry.

In the next step of this embodiment the slurry is spray dried into 50 to 200 micron particles under conditions whereby the particles achieve particle temperatures in the range of about from 800° to 2000°F. The spray dried particles are then calcined at temperatures in the range of 1200° to 2000°F. for a sufficient time dehydrate the clay. Usually this dehydration can be accomplished by merely bringing the particles up to temperature of about 1200°F. or above, and where the particles have achieved particle temperatures in this range during spray drying the calcination step can be omitted.

The dehydrated particles are the mixed with such additional reactants as are required to yield a reaction mixture composition having the following mole ratios:

| | | |
|---|---|---|
| $SiO_2/Al_2O_3$ | 0.5 to 2.5 | preferably 1.7 to 2.3 |
| $M^+_2O/Al_2O_3$ | 0.9 to 6 | preferably 1.5 to 3 |
| $H_2O/M^+_2O$ | Greater than 15 | preferably 16 to 200 |

Typically the reaction mixture can be prepared by merely adding the proper amount of an aqueous solution of sodium hydroxide to the spray dried clay. The pH of the resulting reaction mixture will typically be in the range of about 11 to 14. The reaction mixture is then aged for about from 4 to 48 hours at temperatures in the range of about 15° to 50°C. Conveniently, ambient aging temperatures can be used. The aged mixture is then hydrothermally crystallized for about 4 to 48 hours at temperatures in the range of about 80° to 120°C. The resulting Z–12 binderless molecular sieve zeolite aggregates, (50 to 200 micron particles) are then separated, washed and dried by conventional techniques.

Our inventive high temperature spray drying process can also be used with regard to silica-alumina starting materials, however its use is not as critical since silica-aluminas have high bonding propensities and will form the desired particle sizes (e.g., 50 to 200 microns) even when spray dried at lower temperatures. In applying our process to silica-alumina starting materials the same procedure is followed as set forth above with regard to the hydrated clay embodiment. The second heating step in this embodiment is used to convert the silica-alumina to the zeolitic reactive or dehydrated form, and again can be omitted where the silica-alumina is dehydrated during spray drying by using particle temperatures in about the range of 1200° to 2000°F. We have further found that the silica-alumina starting material must be essentially free from, or washed free of, alkali-metal salts or oxides prior to the high temperature spray drying step or the same deleterious affects described above with respect to the presence of an alkali oxide in the hydrated clay embodiment will occur. The particular method of forming the silica-alumina is not a part of our invention. And suitable silica-alumina starting materials are well known and can be obtained commercially or synthesized by known methods such as for example by the coprecipitation of hydrous silica and hydrous alumina or for example by the method described in detail in the Winyal patent; U.S. Pat. No. 2,886.512.

The attrition index of our product is obtained by subjecting the zeolite to a high velocity air jet by a standard test known as the Roller test. The weight of minus 20 micron particles formed during the test is measured as a criterion of the resistance of the catalyst to inter-particle attrition. The index is obtained by the formula

100A−B/C where A is equal to the −20 micron content of zeolite after attrition in grams, B is equal to the −20 micron content of zeolite before attrition in grams and C is equal to the +20 micron content of the zeolite before attrition in grams. Commercial cracking catalysts have attrition indicies in the range of 15 to 50. Our product has attrition indicies in the range of 5 to 35.

Another characteristic of the zeolites resides in the water adsorption properties. The water adsorption of the zeolites is measured in the following examples, at 25°C. and 11 percent relative humidity and is reported in grams of water adsorbed per 100 grams of zeolite.

The nitrogen pore volume of the product is measured by the technique described in the article by S. Brunauer, P. Emmett and E. Teller, J. Am. Chem. Soc. 60 309 (1938). This method (B.E.T.) depends on the condensation of nitrogen into the pores, and is effective for measuring pores with pore diameters in the range of about 4 to 600 A units.

A further understanding of the invention can be had from the following non-limiting examples.

EXAMPLE 1

This example illustrates preparation of binderless Z–12 molecular sieve zeolite aggregates from an initially hydrated kaolin clay. The product was a hard sperical bead amenable to use in fluid bed operations.

A water slurry of Kaolin (pigment 33 feed clay) was made up containing 70 percent solids. This slurry was spray dried in a laboratory spray drier operated to give a particle temperature in excess of about 800°F. and a pressure of 30 lb./in.$^2$ . The resulting product was calcined at 700°C. for 3 hours and screened. The product in the 50-200 micron size range was separated. This microspheric product was used to prepare Z–12 molecular sieves using the following technique.

To 54.6 g. of the spray dried and calcined clay was added 29.7 g. of NaOH and 267 g. of water. This mixture having the composition $1.5 Na_2O:1Al_2O_3:2SiO_2:6OH_2O$ was then aged for 24 hours at 45°C. followed by crystallization for 16 hours at 100°C. The product thus obtained was filtered, washed and dried at 110°C.

The product had the X-ray diffraction shown in Table A. The water adsorption at 11 percent relative humidity was 19 percent. The product had an attrition index, as determined by The Roller Attrition Test method described previously of 5.2.

EXAMPLE 2

In this example the same procedure is followed as in Example 1 with the exception that sodium silicate is added to the slurry in a quantity to provide a mole ratio of $Na_2O$ to $Al_2O_3$ of 0.4. This slurry does not spray dry properly and cakes along the sides of the spray drier in an unworkable sticky mass instead of forming particles.

EXAMPLE 3

In this example a metakaolin clay is treated in the same manner as in Example 1. The resulting zeolite product is extremely friable and is not suitable for fluidized systems. The attrition resistance of this material is too poor to permit a meaningful Roller Index Test to be made.

EXAMPLE 4

This example illustrates preparation of Z–14 molecular sieve from a spray dried mixture of metakaolin and sodium silicate. The product was in the form of hard spherical beads amenable to use in fluid bed operation.

A water slurry containing 53 percent solids was prepared from sodium silicate and metakaolin using the following technique.

To 210 g. of sodium silicate containing 9.14 percent $Na_2O$ and 28.46 percent $SiO_2$ was added 150 g. of water and 222 g. of metakaolin. The ratios of $Na_2O/Al_2O_3$ and $SiO_2/Al_2O_3$ were 0.3 and 3 respectively. This slurry was spray dried at a particle temperature in excess of about 800°F. using a 30 lb./in.$^2$ of air pressure. This product (18.6 g.) was then reacted with 19.2 g. of $Na_2O$ and 201 g. of water by aging at room temperature for 24 hours and crystallized by boiling for 16 hours. The resulting product was filtered, washed and dried. The attrition index of the product, as determined by the aforementioned Roller Attrition Test, was 24.

EXAMPLE 5

In this example the same procedure is followed as in Example 4 with the exception that sodium silicate is added to the slurry to give a $Na_2O/Al_2O_3$ ratio of 1. This slurry does not spray dry properly and instead of forming the desired 50 to 200 micron particles it cakes along the side of the spray drier in a sticky unworkable mass.

Obviously many modifications and variations of the invention, described hereinabove and in the appended claims, can be made without departing from the essence and scope thereof.

We claim:

1. A process of preparing a binderless Z-12 molecular sieve zeolite aggregates having an average particle size in the range of about from 50 to 200 microns and a Roller Attrition Index of about 5 to 35 which comprises the steps of
    a. providing a hydrated kaolin type clay slurry,
    b. spray drying the slurry at particle temperatures in the range of about 1200 to 2000°F. into hard dehydrated kaolin type clay particles having average particle sizes in the range of about 50 to 200 microns,
    c. admixing such additional zeolites reactants with the dehydrated clay particles as are required to provide a reaction mixture having about the following mole ratios: $SiO_2/Al_2O_3$ 0.5 to 2.5 $M_nO/Al_2O_3$ 0.9 to 6 $H_2O/M_nO$ greater than 15
    wherein M is a metal cation and n is its valence,
    d. aging the reaction mixture at temperatures in the range of from 15° to 50° C. for about from 4 to 48 hours.
    e. hydrothermally reacting the aged reaction mixture at temperatures in the range of about from 80 to 120° C. for about from 4 to 48 hours, and
    f. recovering the desired binderless crystalline aluminosilicate zeolite aggregate product.

2. The process of claim 1 wherein said slurry is an aqueous slurry.

3. The process of claim 1 wherein the recovered binderless molecular sieve is washed and dried.

4. The process of claim 1 wherein said reaction mixture is prepared by the addition of aqueous sodium hydroxide to the spray dried clay particles.

5. The process of claim 1 wherein said kaolin type clay is kaolin.

6. The process of claim 1 wherein M is selected from the group consisting of the cations of sodium, potassium and mixtures thereof.

7. A process for preparing a binderless molecular sieve zeolite aggregates having an average particle size in the range of about from 50 to 200 microns and a Roller Attrition Index of about 5 to 35 which comprises the steps of
    a. providing a hydrated silica-alumina slurry,
    b. spray drying the slurry at particle temperatures in the range of about 1200° to 2000° F. into hard dehydrated silica alumina particles having average particle sizes in the range of about 50 to 200 microns,
    c. admixing such additional zeolites reactants with the dehydrated particles as are required to produce the desired type of zeolite,
    d. aging the reaction mixture at temperatures in the range of about from 15° to 50° C. for about from 4 to 48 hours,
    e. hydrothermally reacting the aged reaction mixture at temperatures in the range of about from 80 to 120° C. for about from 4 to 48 hours, and
    f. recovering the desired binderless crystalline aluminosilicate zeolite aggregate product.

* * * * *